United States Patent [19]
Valenta, Jr.

[11] 3,790,707
[45] Feb. 5, 1974

[54] METHOD AND APPARATUS FOR DERIVING A VELOCITY SIGNAL FROM CONTINUOUSLY MOVING INFORMATION BEARING MEDIA

[75] Inventor: Harry L. Valenta, Jr., North Chili, N.Y.

[73] Assignee: Eastman Kodak Company, Rochester, N.Y.

[22] Filed: July 3, 1972

[21] Appl. No.: 268,249

[52] U.S. Cl............ 178/7.2, 178/DIG. 28, 328/127
[51] Int. Cl. ............................................ H04n 5/86
[58] Field of Search 178/DIG. 28, 7.2, 5.2 D, 6.7 A; 328/129, 130, 127; 307/232, 229

[56] References Cited
UNITED STATES PATENTS

| | | | |
|---|---|---|---|
| 3,604,850 | 9/1971 | Eckenbrecht................ | 178/DIG. 28 |
| 3,621,121 | 11/1971 | Eckenbrecht et al............ | 178/5.2 D |
| 3,700,795 | 10/1972 | Eckenbrecht et al.............. | 178/7.2 |

*Primary Examiner*—Robert L. Griffin
*Assistant Examiner*—George G. Stellar
*Attorney, Agent, or Firm*—W. H. J. Kline et al.

[57] ABSTRACT

The velocity of continuously moving information bearing media, such as perforated motion picture film bearing successive image frames, is derived from the detection of the movement of the image frames past first and second image frame detecting means displaced apart a distance $\Delta D$ in the direction of continuous movement and the production of corresponding first and second time-spaced signals having first and second time periods, respectively. Means are provided for transforming the first and second time-spaced signals into a velocity signal, such means including a reference signal having a value representative of the physical distance $\Delta D$, first integrator means responsive to the velocity signal for producing a first ramp signal having a ramp slope dependent upon the value of the velocity signal and a period established by the second signal, difference means responsive to the reference signal and the first ramp signal for producing a second ramp signal representative of the instantaneous difference between the value of the reference signal and the time varying ramp slope of the first ramp signal, second integrator means responsive to the instantaneous amplitude of the difference signal for producing the velocity signal, and gate means responsive to the first signal that operates as a sampling signal for applying the second ramp signal to the second integrator means for a sampling period corresponding to the first period of the first signal, whereby the second integrator means is responsive to the sampled instantaneous value of the second ramp signal during the sampling period to produce the velocity signal having a value representative of the first predetermined rate of movement of the information bearing media and independent of non-uniform spacings of successive image frames. In telecine reproduction apparatus, the first ramp signal may be employed to modify the scanning rate of the telecine apparatus to synchronize it to the continuously moving image frames.

12 Claims, 4 Drawing Figures

METHOD AND APPARATUS FOR DERIVING A VELOCITY SIGNAL FROM CONTINUOUSLY MOVING INFORMATION BEARING MEDIA

CROSS REFERENCE TO RELATED APPLICATIONS

Reference is made to commonly assigned, copending U.S. Patent application Ser. No. 60,493, entitled FILM SCANNING FOR TELEVISION REPRODUCTION, filed Aug. 3, 1970 in the names of David L. Babcock and Lenard M Metzger; to commonly assigned, co-pending U.S. Patent application Ser. No. 191,673, entitled METHOD AND APPARATUS FOR DERIVING THE VELOCITY AND RELATIVE POSITION OF CONTINUOUSLY MOVING INFORMATION BEARING MEDIA, filed Oct. 22, 1971, in the names of John J. Bradley, Carl N. Schauffele, and John Q. St Clair II; and to commonly assigned copending U.S. Patent application Ser. No. 189,675, entitled GAIN CONTROL CIRCUIT filed October 15, 1971 in the names of Carl N. Schauffele and Harold L. Valenta.

BACKGROUND OF THE INVENTION

1. Field of the Invention

This invention relates to a method and apparatus for detecting the movement of image frames on continuously moving information bearing media and deriving a velocity signal representative of the rate of movement of the information bearing media unaffected by irregular spacing of the image frames along the information bearing media.

2. Description of the Prior Art

In all three of the aforementioned U.S. Patent Applications, a method and apparatus are disclosed for deriving from pictorial information in image frames on information bearing media, such as color motion picture film, continuously moving at a first predetermined rate, electrical signals suitable to the production of a visual display of the pictorial information, such as a color television display. The derivation of the electrical signals is accomplished by an optical scanner, such as a flying spot scanning tube, that develops a two dimensional television scanning raster pattern of light that recurs at a frequency of 60 Hz., optical means for directing the raster of light through an image frame of the motion picture film in a film scanning zone and upon optical-to-electrical signal transducer apparatus for transforming the scanned pictorial information into color television fields for application to a color television transmitter or receiver and the eventual reproduction of the pictorial information on the screen of a color television receiver. Since the video fields for television are repeated at or about 60 fields per second, and the normal projection rate for motion picture film is 18 or 24 frames per second, each film frame must be scanned in the scanning station at least twice. Therefore, it is also necessary to synchronize the television scanning raster pattern with respect to the position of the moving image frames. As discussed at length in the aforementioned U.S. Patent Applications, such synchronization may involve the detection of indicia or sprocket holes associated with the film frames and the production of a vertical scan modification signal that, when added to the 60 Hz. vertical deflection signal and applied to the vertical deflection yoke of the flying spot scanner tube shifts the position of the scanning raster pattern vertically in the direction of movement of the motion picture film at predetermined occurrences of the 60 Hz. vertical deflection signal an amount sufficient to compensate for the difference between the 60 Hz. television field rate frequency and the 18 or 24 frame per second rate of movement of the motion picture film and to provide for the scanning of each film frame at least twice.

The vertical scan modification signal disclosed in the aforementioned U.S. Patent Applications constitutes a sawtooth or ramp wave form signal periodically repeating in synchronism with and at integral multiples of the period of the 60 Hz. vertical deflection signal and a ramp slope that is directly related to the velocity of the moving motion picture film. In U.S. application Ser. NO. 60,493, the velocity signal was derived over a period of several film frames through a continuous comparison of the instantaneous amplitude of the ramp slopes of the constituent double ramp signals recurring at half the film rate of movement, i.e., at 12 Hz., with respect to each other and a reference signal having an amplitude representative of the average distance between successive film frame indicia or sprocket holes on the motion picture film. The resultant difference signal representing the velocity of the moving motion picture film controlled the ramp slopes of the 12 Hz. double ramp signals.

A modification of the vertical deflection circuit of U.S. Patent application Ser. No. 60,493 is disclosed in the aforementioned U.S. Patent application Ser. No. 189,675 wherein the instantaneous amplitude of the double ramp signals were sequentially sampled at predetermined intervals and were integrated and compared with the amplitude of the reference signal to produce the velocity or ramp slope control signal. Neither of the two disclosed vertical deflection circuits accounted for variations in the spacing of successive image frames and their associated indicia or sprocket holes along the length of the motion picture film created during the manufacture of such motion picture film. These spacing variations may manifest themselves as a very low frequency disturbance in the synchronism of the scanning raster pattern upon the moving image frames resulting in misregistration of successive video fields displayed on the screen of the television receiver.

In the aforementioned U.S. Patent application Ser. No. 191,673, there is disclosed an image frame detector for use in apparatus of the type described comprising first and second image frame detecting means spaced apart a predetermined distance Δ D and operative to produce first and second signals in response to the detection of an image frame by the first and second image frame detecting means. The elapsed time period between the first and second signal is indicative of the velocity of the moving image frames with respect to the first and second image frame detecting means and is unaffected by unequal spacing of successing image frames.

SUMMARY OF THE INVENTION

It is an object of the present invention to provide improved methods and apparatus for deriving a velocity signal related to the velocity of moving strip material.

Another object of the invention is to provide improved methods and apparatus for deriving a velocity signal representative of the velocity of image frames on continuously moving information bearing media from the time period elapsing between the production of first and second signals by first and second image frame detecting means.

These and other objects of the invention may be realized in a method and apparatus of the type described wherein first and second detecting means are physically displaced apart a distance Δ D in the direction of continuous movement of the corresponding indicia bearing strip material or information bearing media for detecting the indicia or image frames on the strip material or information bearing media moving with respect to the first and second detecting means and for producing corresponding first and second time-spaced signals having first and second time periods, respectively, in response to the detection of each such indicia or image frame and means for transforming the first and second time-spaced signals into a velocity signal having a value which is a function of the velocity or rate of movement of the detected strip material or image frames between the first and second detecting means. More particularly, the transforming means further comprises a reference signal having a constant value representative of the physical distance Δ D, means responsive to the velocity for producing a third signal having a time varying value and responsive to the second signal for resetting the time varying value to a reference level during the second time period of the second signal, means for producing a fourth signal having a time varying value which is a function of the instantaneous relation between the constant value of the reference signal and the time varying value of the third signal, means responsive to the fourth signal for producing the velocity signal having a value related to the first predetermined rate, and a switch responsive to the first signal for applying the fourth signal to the velocity signal producing means during the first period of the first signal, whereby said means is responsive to the fourth signal during the first period of the first signal to produce the velocity signal having a value representative of the rate of movement of the strip material or information bearing media and independent of non-uniform spacing of successive indicia or image frames.

In a double ramp scanning system of the type described hereinbefore, the means responsive to the velocity signal may comprise one of the double ramp signal producing integrators. In a further embodiment of the invention, the principle of operation of the means responsive to the velocity signal is expanded to comprise both the first and the second double ramp signal producing integrators, and the first signal may be alternately applied to the first and second double ramp signal producing integrators to reset the double ramp signals to the reference level, and alternately applied second signals may sample and instantaneous amplitudes of the double ramp signals through first and second switches substituted for the single switch described above.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
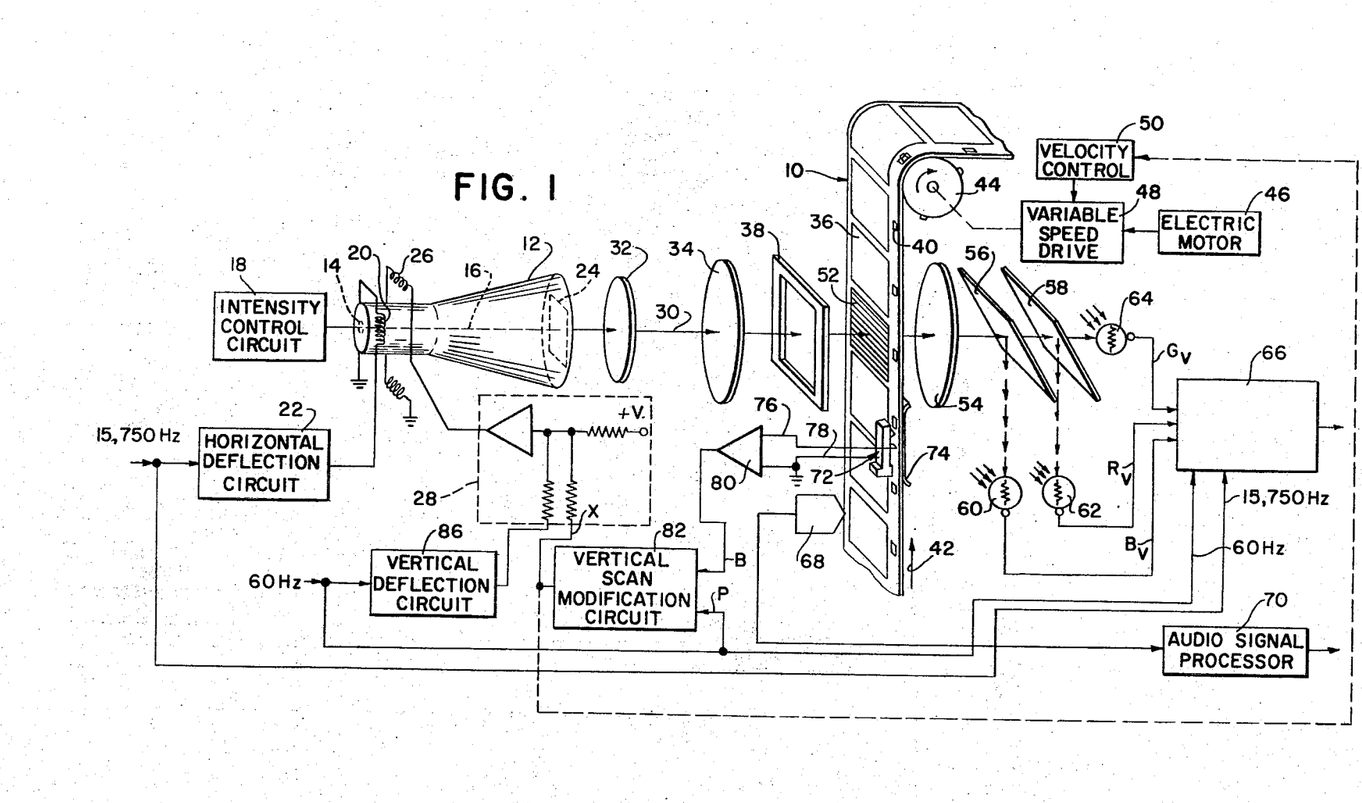
FIG. 1 is a schematic illustration in partial perspective of a film scanning system for television reproduction including a film perforation sensor and the improved vertical scan modification circuit of FIG. 2.
Figures 2, 4:
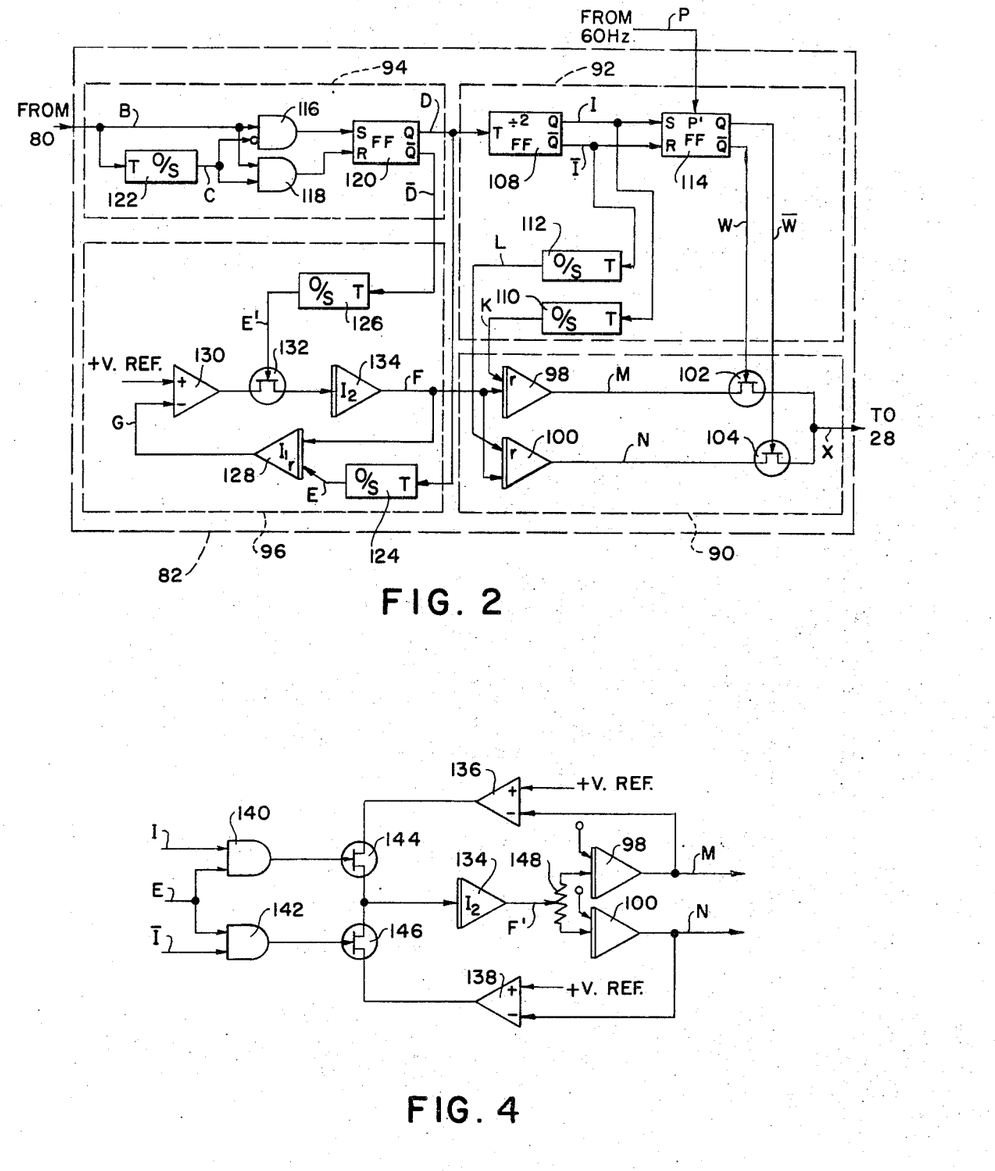
FIG. 2 is a logic circuit diagram of the various elements of the vertical scan modification circuit of FIG. 1 including a film velocity detector circuit.
FIG. 4 is a logic circuit diagram showing a further embodiment of the invention combining the velocity detector and ramp generator circuits of the vertical scan modification circuit of FIG. 2.

Referring now to the drawings, FIG. 1 discloses the environment in which the vertical scan modification circuit of this invention including the improved velocity detector and ramp generator circuits of FIG. 2 responds to signals developed by a perforation sensor to produce vertical scan modification signals for synchronizing the vertical displacement of the scanning raster pattern of light developed by a flying spot scanner to the actual position and velocity of image frames on motion picture film continuously advancing through a film scanning zone. More particularly, FIG. 1 is closely related to corresponding figures in the aforementioned commonly assigned copending U.S. Patent Applications in which there is shown a scanning system for optically scanning image frames of the information bearing media which, in this instance, comprises motion picture film 10, and transducing the scanned image frames into video signals suitable for television transmission or direct application to a television receiver to produce a visual display of the pictorial information in the image frames on the screen of the television receiver. The scanning system includes a cathode ray tube 12 having a cathode 14 that emits an electron beam 16, the concentration of which is controlled by an intensity control circuit 18. A horizontal deflection yoke 20 operates in a well known manner under the influence of the horizontal deflection circuit 22 to direct the beam 16 horizontally across a scanning area 24 on the luminous screen of cathode ray tube 12 at a standard television scanning frequency of 15,750 Hz. A vertical deflection yoke 26 operates to deflect vertically the electron beam 16 in response to the complex vertical deflection signal generated at the output terminal of the summing amplifier 28.

The screen of the cathode ray tube 16 preferably is composed of a wide band spectral emission florescent material which, when excited by the electron beam 16, will produce a light spot on the tube face. The scanning area 24 preferably has a rectangular configuration as shown over which the electron beam 16 may be swept in discrete vertically spaced-apart horizontal lines forming a scanning raster pattern of the scanning light beam 30. The light beam 30 is condensed by a lens 32 and thereafter focused by a lens 34 onto the image frame 36 of the motion picture film 10 moving through the scanning station defined by the mask 38.

As stated hereinbefore, the image bearing media may take the form of, for example, color motion picture film which has been exposed in a motion picture camera and processed using known techniques, an exemplary film being commercially available Super 8 movie film. As is well known in the art, such film is manufactured with spaced sprocket holes or perforations 40 along one side to enable the film to be advanced at a predetermined intermittent rate in a camera and exposed to record pictorial information thereon in spaced discrete image frames 36 referenced in position to a corresponding perforation 40. Since the perforation 40 may not be uniformly spaced apart, the corresponding image frames 36 may not be uniformly spaced apart on the film 10. The standard film exposure frame rate is normally 18 or 24 frames per second.

The film 10 is advanced through the scanning station 38 in the upward direction indicated by the arrow 42 by sprocket wheel 44 (or a capstan) that is driven in the clockwise direction by an electric motor 46. A variable speed drive 48 interposed between the electric motor 46 and the sprocket wheel 44 may take various forms well known to those skilled in the art. A velocity control 50 may be operated in response to apparatus for sensing the velocity of the moving film 10 to be described hereinafter to control the variable speed drive 48 and to regulate the rate of movement of the film 10.

The scanning light beam 30 passes through the image frame 36 within the scanning station 38 in a raster pattern depicted, for example, as 52 and is modulated by the color pictorial information thereon. The modulated light beam is focused by a lens 54 and is intercepted by dichroic mirrors 56 and 58 which are effective to separate and pass the blue, red and green color components of the modulated light to respective photoresponsive devices 60, 62 and 64 which translate the intensity of the respective color components into electrical signals which are applied to the video color signal processor 66 of the television transmitter or receiver in conjunction with horizontal and vertical scan synchronization signals to produce video television field signals.

The film 10 may also have a sound track which may be detected by an audio reproduction transducer 68 and translated into audio frequency signals by the audio signal processor 70 of the television transmitter or receiver.

The system hereinbefore described with respect to FIG. 1 is known in the prior art of telecine reproduction. The invention described in detail in the aforementioned copending U.S. application Ser. No. 60,493 pertains to a system for adjusting the scanning rate of the flying spot scanner 12 in accordance with the rate of movement of the film 10. In the aforementioned U.S. Patent application Ser. No. 191,673, an improved perforation sensor (72 in FIG. 1) having first and second perforation sensing elements spaced apart a predetermined distance $\Delta D$ is disclosed for producing first and second time-spaced signals in response to the movement of a continuously moving perforation 40 (corresponding to an image frame 36) past the first and second perforation detecting elements. The principles of operation of the double ramp vertical deflection signal as disclosed in U.S. application Ser. No. 60,493 and the improved perforation sensor for providing an indication of the instantaneous velocity of the moving film 10 irrespective of variations in the spacing of successive image frames 36 on film 10 as disclosed in the aforementioned U.S. application Ser. No. 191,673 are incorporated in the remaining elements of FIG. 1 and in the improved velocity detector shown in FIGS. 2 and 4.

Accordingly, the perforation sensor 72 is fixedly located with respect to the path of travel of the perforation 40 of the film 10 continuously moving between the perforation sensor 72 and a backing plate 74. The electrical output conductors 76 and 78 of the perforation sensor are applied to the input terminal of an amplifier 80 which responds to signal A (FIG. 3) to produce the first and second pulses at times $t_i$ and $t_i'$, respectively, of signal B (FIG. 3) which are applied to an input terminal of the vertical deflection modification circuit 82 shown more completely in FIG. 2. A 60 Hz. pulse signal P (59.97 Hz. for color television systems) is applied to a vertical deflection circuit 86 to produce a 60 Hz. sawtooth wave form vertical deflection signal (not shown) and to the second input of the vertical deflection modification circuit 82. The 60 Hz. sawtooth wave form signal developed by the vertical deflection circuit 86, the vertical scan modification signal X (FIG. 3) produced by the vertical deflection modification circuit 82 and a DC voltage offset signal are all applied to the input terminals of summing amplifier 28 which combine the respective signals to produce a complex vertical deflection signal having a complex sawtooth wave form that controls both the production of the scanning raster pattern by the cathode ray tube 12 and its vertical displacement in synchronism with the continuously moving image frames 36.

Referring now to FIG. 2 there is shown in greater detail the vertical deflection modification circuit 82 of FIG. 1 including a double ramp signal generating circuit 90, a double ramp switching logic circuit 92 for switching from one ramp signal to the other ramp signal in accordance with the teachings of the aforementioned U.S. Patent application Ser. No. 60,493 and a signal separating circuit 94 and velocity detector circuit 96 comprising one preferred embodiment of the present invention. The ramp generator circuit 90 includes first and second double ramp integrators 98 and 100 each having an input terminal adapted to receive a velocity signal F developed by the velocity detector circuit 96 and a reset input terminal adapted to receive reset signal K and L, the double ramp integrators 98 and 100 producing double ramp signals M and N each having a period equal to the periods of the reset signals K and L, respectively, and a ramp slope dependent upon the electrical parameter of the velocity signal F. The double ramp signals represent the instantaneous position and velocity of first and second successive image frames 36 continuously moving through the scanning zone 38. The ramp generator circuits 90 also include first and second ramp switching field effect transistors 102 and 104 which are effective when gated conductive by gate signals W and $\overline{W}$ developed by the double ramp switching logic circuit 92 to conduct either the first or the second double ramp signal to the common output terminal 106.

The double ramp switching logic circuit 92 comprises a $\div 2$ flip flop 108 adapted to receive at its trigger T input terminal the first pulse of signal B developed by the separating circuit 94 at times $t_i$ representing the instantaneous position of an image frame 36 with respect to the film scanning frame 38. The first pulse of signal B recurs at times $t_i$ at a frequency equal to the predetermined rate of movement of the film 10, e.g., 24 Hz. The $\div 2$ flip flop 108 produces first and second complementary half frame rate frequency signals, 180° out-of-phase with respect to each other, I and $\overline{I}$ (not shown) at the Q and $\overline{Q}$ output terminals, respectively. These complementary 12 Hz. signals are each applied to the input of one shot circuits 110 and 112 to produce the first and second reset signals K and L.

Thus, the first and second 12 Hz., 180° out-of-phase, reset signals K and L establish the frequency and relative timing of the first and second double ramp signals M and N at 12 Hz. by resetting the double ramp integrators 98 and 100.

The flip flop 114 in the double ramp switching logic circuit 92 has an input P' adapted to receive the 60 Hz. pulse signal P and S and R inputs adapted to receive the complementary signals I and $\bar{\text{I}}$, respectively. As explained more completely in the aforementioned U.S. Patent application Ser. No. 189,675 flip flop 114 responds to the 60 Hz. pulse signal P to switch the Q and $\bar{\text{Q}}$ outputs to the logic levels at that instant at the corresponding inputs S and R. Therefore, the Q and $\bar{\text{Q}}$ outputs are switched to logic level at each instance that a 60 Hz. signal P applied to the P' input immediately succeeds, in time, a change in the logic level applied to the S and R inputs. Therefore, as clarified by reference to FIG. 3, the first and second ramp switching signals W and $\bar{\text{W}}$ each have complementary periods equal to an integral multiple number of the period of the 60 Hz. signal P.

Figure 3:
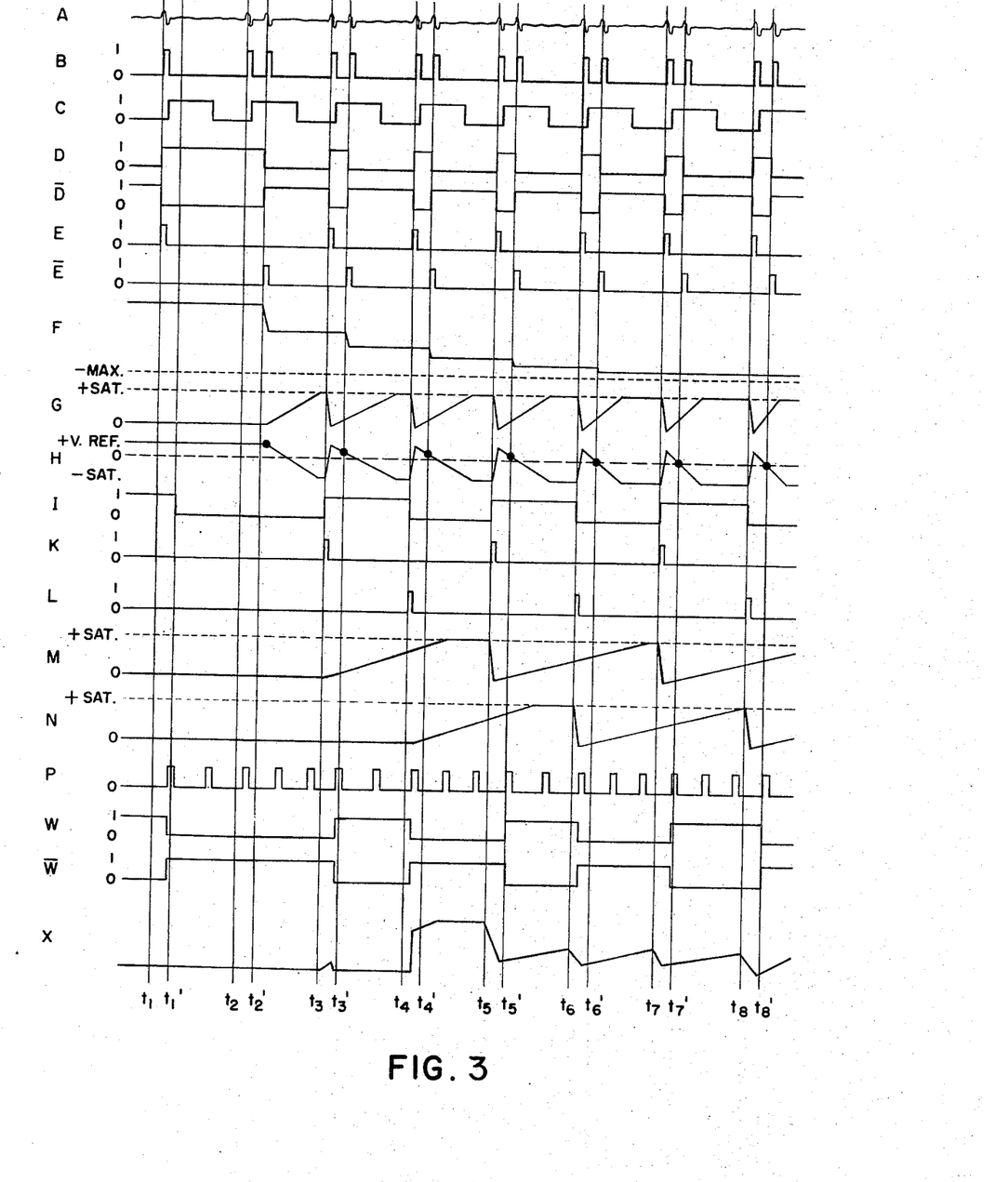
FIG. 3 is a wave form diagram of signal developed at various points in the scanning system of FIG. 1 and the vertical scan modification circuit of FIG. 2.

The first and second ramp switching signals W and $\bar{\text{W}}$ are applied to the gate input of FETs 102 and 104 to render them conductive whenever the first and second ramp switching signals W and $\bar{\text{W}}$ are at the 1 logic level shown in FIG. 3. Therefore, the first and second FETs 102 and 104 are alternately rendered conductive to switch alternate periods of the respective first and second double ramp signals M and N to the common output terminal 106 to develop the vertical scan modification signal X.

The signal separating circuit 94 includes first and second AND gates 116 and 118 connected to the output of the amplifier 80 of FIG. 1 and adapted to receive the signal B therefrom. The output terminals of the AND gates 116 and 118 are connected to the S and R inputs of flip flop 120. A one shot circuit 122 is also connected to receive the signal B at its input terminal T and is connected at its output terminal to a second input terminal of the AND gate 118 and a signal inverting input terminal of the AND gate 116. The one shot circuit 122 responds to the negative transition of a pulse of signal B to produce a high output level shown as wave form C in FIG. 3 for a predetermined period that is greater than the expected period between the first and second pulses of signal B but is shorter than the period between successive first pulses of signal B. The first pulse of signal B occurring after the output of one shot circuit 122 has switched to the low or 0 logic level is passed by AND gate 116 to the S input of flip flop 120 since a high logic level is applied to one input and the low logic level is applied to the signal inverting input of AND gate 116. The application of the first pulse of signal B to the S input of flip flop 120 switches the Q and $\bar{\text{Q}}$ outputs of flip flop 120 to the high and low logic levels, respectively. Thus, the first pulse of signal B is effectively applied to the T input of ÷2 flip flop 108 to trigger the alternate resetting of the double ramp signal as a function of the detected position of alternate image frames in the film scanning zone 38 as described hereinbefore.

Following the termination of the first pulse of signal B, the one shot circuit 122 produces the signal C having a high logic level, and the second pulse of signal B is gated by AND gate 118 to the R input of flip flop 120 which responds thereto to switch the Q and $\bar{\text{Q}}$ output terminals to the low and high logic levels, as shown by signals D and $\bar{\text{D}}$, respectively. Thus, the first and second pulses of the wave form B are separated by signal separating circuit 94. As shown in FIG. 3, if only a single pulse occurs at an instant $t_1$, when both the first and second pulses should have occurred, that pulse is treated as a first pulse producing a high logic level at the Q output of flip flop 120 until a second pulse of the succeeding pair of pulses at time $t_2'$ occurs. Thereafter, the circuit 94 operates as described to separate the first and second pulses of the wave form B into signals D and $\bar{\text{D}}$, respectively.

The signals D and $\bar{\text{D}}$ are also applied to the velocity detector circuit 96 of the present invention which converts the time period between the first and second pulses of wave form B into a velocity signal having a value indicative of the instantaneous velocity of the moving motion picture film 10. The signals D and $\bar{\text{D}}$ are applied to one shot circuits 124 and 126 respectively which respond to the leading edges thereof to produce the first or reset signal E and the second or sampling signal E' A first integrator 128 has an input terminal adapted to receive the velocity signal F and a reset terminal adapted to receive the reset signal E. The output terminal of the first integrator 128 is connected to the negative input terminal of differential amplifier 130. The positive input terminal of differential amplifier 130 is connected to a reference signal having a constant positive voltage whose amplitude is representative of the distance $\Delta$ D between the first and second elements of the perforation sensor 72. The output terminal of differential amplifier 130 is connected to a sampling FET 132, the gate electrode of which is connected to the one shot 126 to receive the sampling signal E'. The remaining terminal of FET 132 is connected to the input terminal of the second integrator 134. Second integrator 134 responds to the amplitude of the difference signal H developed by differential amplifier 130 applied to its input terminal during the sampling period of sample signal E' to produce the velocity signal F.

Referring now to FIG. 3, and assuming that the velocity signal F initially has an amplitude of zero volts, the output ramp signal G of the first integrator 128 is also at zero volts, and the occurrence of a reset signal E at time $t_1$ has no effect upon the amplitude of output ramp signal G. However, the difference signal H produced by differential amplifier 130 is equal to the positive reference signal voltage level, and the occurrence of a sampling signal E' at time $t_2'$ actuates FET 132 to apply the full reference signal voltage level to the input of the second integrator 134. The second integrator 134 integrates the reference signal voltage level over the sampling time period to produce the negative amplitude of the velocity signal F and holds this negative level during the time period $t_2'$ to $t_3$. The negative voltage level of the velocity signal F is integrated by the first integrator 128 during the interval $t_2'$ to $t_3$ at which instant the output ramp signal G is reset to zero volts. During this interval, $t_2'$ to $t_3$, the difference signal H reduces in amplitude from the positive reference voltage level to its negative saturation level (assuming that the maximum saturation level of the output signal G is greater than or equal to the reference level). At each occurrence of the reset signal E, the difference signal H is reset to the positive voltage reference level.

Thereafter, at each occurrence of the sampling signal E' at times $t_i'$ the amplitude of the difference signal H is sampled and applied to the second integrator 134 which integrates the instantaneous sampled level of the difference signal H to produce the velocity signal F. As shown in FIG. 3, as the amplitude of the velocity signal F becomes more negative, the difference signal H lowers in amplitude at each sampling period $t_i'$ until the velocity signal F stabilizes at the level depicted over the interval from $t_6'$ through $t_8'$. This negative voltage level of the velocity signal F is characteristic of and dependent upon the actual velocity of the film 10 which, in this instance, is presumed to be 24 frames per second. In the event that the velocity changes, the time period between the reset and sampling intervals $t_i$ and $t_i'$ changes and the sampling signal $\overline{E}$ samples an instantaneous voltage level of the difference signal H that differs from that level sampled as shown in FIG. 3 to produce a stablized velocity signal F having a negative voltage amplitude that differs from that shown for 24 frames per second.

The remaining wave forms of signals I to K of FIG. 3 pertain to the operation of the double ramp generator circuit 90 and the double ramp switching logic circuit 92, the operation of which has been described hereinbefore. It should be noted that the double ramp signals M and N respond directly to the voltage amplitude of the velocity signal F, and are not fully stabilized until the velocity signal F stabilizes after time $t_6'$. During the interval from $t_2'$ to $t_6'$ double ramp integrators 98 and 100 saturate rapidly in response to the large scale changes in the amplitude of the velocity signal F. The corresponding combined vertical scan modification signal X also rapidly saturates. After the amplitude of the velocity signal F stabilizes, the vertical scan modification signal X also stabilizes and provides a ramp displacement which, when added to the 60 Hz. vertical deflection signal controls the vertical displacement of the raster pattern and the constituent horizontal line scans of the raster pattern.

Referring now to FIG. 4 there is shown a modification of the velocity detector 96 and the double ramp signal generator circuit 90 wherein the double ramp integrators 98 and 100 also function as the first integrator 128 of velocity detector circuit 96. In this circuit, the instantaneous amplitudes of the double ramp signals M and N are compared in first and second differential amplifiers 136 and 138 to the positive voltage amplitude of the reference signal + V and are alternately sampled by alternate pulses of the sampling signal E' switched by AND gates 140 and 142 to first and second FETs 144 and 146. The sampling signal E' is alternately directed to the first and second FETs 144 and 146 during the interval that the first and second half frame rate frequency signals I and $\overline{I}$ are high. Therefore, the double ramp signals M and N are sampled immediately following the resetting of the first and second dual ramp integrators 98 and 100 by the signals K and L. The sampled voltage levels of the double ramp signals M and N with respect to the reference signal + V are conducted through the integrator 134 which develops the velocity signal F' in the same manner as described above with respect to FIGS. 2 and 3. A variable resistor 148 has been added to balance the input resistances of the double ramp integrators 98 and 100 with respect to the output terminal of the second integrator 124. Therefore, in the circuit of FIG. 4, the double ramp integrators 98 and 100 correspond to the first integrator 128 of FIG. 2 and the second integrator 134 is common to both circuits. The circuit of FIG. 4 advantageously monitors the signal level of the double ramp signals M and N with direct reference to the positive voltage level of the reference signal + V to provide the velocity signal F'.

Thus, there has been shown an improved velocity signal detecting circuit for monitoring the velocity of moving information bearing media and providing a velocity signal independent of variations in the spacing between image frames on the moving information bearing media. The developed velocity signal is self stabilizing having a value which is a function of the actual detected rate of movement of the motion picture film with respect to a reference signal having a value representative of the physical displacement between the element of an image frame detector.

The invention has been described in detail with particular reference to the preferred embodiments thereof, but it will be understood that variations and modifications can be effected within the spirit and scope of the invention.

I claim:

1. Apparatus for deriving the velocity of strip material bearing spaced indicia and continuously moving in a path of travel, said apparatus comprising:
    a. means including first and second indicia detecting means physically displaced apart a distance $\Delta D$ in the direction of continuous movement of the strip material for detecting the indicia on the strip material moving in said path of travel with respect to the first and second indicia detecting means and for producing corresponding first and second time spaced signals in response to the detection of each such indicia; and
    b. means responsive to the first and second time-spaced signals for producing a velocity signal having a value which is representative of the velocity of the detected indicia between the first and second indicia detecting means, said velocity signal producing means further comprising:
        1. means for providing a reference signal having a constant value representative of the physical distance $\Delta D$;
        2. means responsive (i) to the velocity signal for producing a third signal having a time varying value and (ii) to the first signal for resetting the time varying value of said third signal to a reference level;
        3. means responsive to the reference signal and the third signal for producing a fourth signal having a time varying value which is a function of the instantaneous relationship between the constant value of the reference signal and the time varying value of the third signal; and
        4. means responsive to the second signal and the fourth signal for producing the velocity signal as a function of the time varying value of the fourth signal, the velocity signal having a value representative of the velocity of the strip material and independent of the spacing of successive indicia on the strip material.

2. The apparatus of claim 1 wherein the means for producing the third signal comprises first integrator means responsive to the velocity signal for producing a ram signal having a period dependent upon the period of recurrence of the first signal, and the means for producing the velocity signal comprises second integrator means responsive to the fourth signal for producing the velocity signal and switch means responsive to the second signal for applying the fourth signal to the second integrator means whereby the second integrator means is responsive to the fourth signal during the occurrence of the second signal to produce said velocity signal.

3. The apparatus of claim 2 wherein the strip material comprises pictorial information bearing media in image frames referenced in position on said information bearing media to successive indicia on the media.

4. In apparatus for deriving from pictorial information in image frames on information bearing media continuously moving at a predetermined velocity in a path of travel, electrical signals suitable to the production of a visual display of the pictorial information recurring at a predetermined rate differing from the predetermined velocity under the control of means for synchronizing the velocity rate of recurrence of the visual display with the velocity of continuous movement of the information bearing media, wherein successive image frames on the information bearing media are non-uniformly spaced with respect to each other in the direction of movement of the information bearing media, apparatus for producing a velocity signal for application to the synchronizing means, said velocity signal producing apparatus comprising:

a. means including first and scond image frame detecting means physically displaced apart a distance $\Delta D$ in the direction of continuous movement of the information bearing media for detecting the image frames continuously moving in said path of travel with respect to the first and second image frame detecting means and for producing time-spaced reset and sampling signals, respectively, having reset and sampling time periods, respectively, in response to the detection of each such image frame; and b. means responsive to the time-spaced reset and sampling signals for producing a velocity signal having a value representative of the velocity of the detected image frames between the first and second image frame detecting means, said velocity signal producing means further comprising:

1. means for providing a reference signal having a constant level representative of the physical distance $\Delta D$;

2. first integrator means (i) responsive to the velocity signal for producing a ramp signal having a time varying level and (ii) responsive to the reset signal for resetting the ramp signal level to a reference level during the reset period of the reset signal;

3. difference means responsive to the reference signal and the ramp signal for producing a difference signal having a time varying level which is a function of the instantaneous difference between the constant level of the reference signal and the time varying level of the ramp signal;

4. second integrator means responsive to the difference signal for producing the velocity signal; and 5. switch means responsive to the sampling signal for conducting the difference signal to the second integrator means for the sampling period of the sampling signal, whereby the second integrator means is responsive to the sampled difference signal to control the level of the velocity signal as a function of the sampled level of the difference signal and representative of the first predetermined rate of movement of the information bearing media and independent of non-uniform spacing of successive detected image frames.

5. The apparatus of claim 4 wherein said synchronizing means is responsive to the rate of recurrence of the visual display and the ramp signal produced by the first integrator means for synchronizing the rate of recurrence of the visual display with the velocity of continuous movement of the information bearing media.

6. The apparatus of claim 4 wherein the information bearing media comprises color motion picture film and further comprising a color television receiver for producing the visual display of pictorial information on color motion picture film recurring at the television field rate.

7. In optical-to-electrical signal transducer apparatus including means for scanning in a raster pattern repeating at a first frequency the image frames of motion picture film continuously moved through a film scanning zone at a predetermined velocity corresponding to a second frequency differing from the first frequency and for deriving video television field signals from the scanned image frames in combination with first and second image frame detecting means physically displaced apart a distance $\Delta D$ in the direction of continuous movement of the motion picture film for detecting the movement of the image frames with respect to the first and second image frame detecting means and for producing corresponding reset and sampling time-spaced signals having reset and sampling time periods, respectively, and a frequency equal to the first frequency; vertical scan modification means responsive to the reset signal and a velocity signal representative of the velocity of the moving motion picture film for producing first and second double ramp signals representative of the position and velocity of successive image frames moving through said film scanning zone; and double ramp switching logic means responsive to the first frequency of the scanning raster pattern and the first signal for applying alternate periods of the double ramp signals to said scanning means for deflecting the raster pattern over the moving image frames to scan corresponding successive image frames of the motion picture film moving through said film scanning zone; the improvement in means for deriving a velocity signal representative of the velocity of the motion picture film and independently of spacing variations between successive image frames comprising:

a. means for providing a reference signal having a constant level representative of the physical distance $\Delta D$ between said first and second film frame detecting means;

b. difference means responsive to the reference signal and the first and second double ramp signals for producing corresponding first and second difference signals each having a time varying level which is a function of the instantaneous difference between the constant level of the reference signal and the time varying levels of the double ramp signals;

c. integrator means responsive to the first and second difference signals for producing the velocity signals having a value related to the first frequency; and d. switch means responsive to the sampling signal for alternately applying the first and second difference signals to the integrator means for the sampling period of the sampling signal, whereby the integrator means is responsive to the first and second difference signals during the sampling period of the sampling signal to produce the velocity signal having a value representative of the first frequency and rate of movement of the motion picture film and independent of non-uniform spacing of successive image frames.

8. A method of deriving the velocity of strip material bearing spaced indicia and continuously moving in a path of travel, said method comprising the steps of:
  a. detecting the indicia on the strip material continuously moving in said path of travel past a first predetermined point and producing a first signal in response thereto;
  b. detecting the indicia on the strip material continuously moving in said path of travel past a second predetermined point physically displaced apart a distance $\Delta D$ in the direction of continuous movement of the strip material from the first predetermined point and producing a second signal in response thereto; and
  c. transforming the first and second signals into a velocity signal having a value representative of the velocity of the detected indicia between the first and second predetermined points, the transforming step further comprising the steps of:
    1. providing a reference signal having a constant value representative of the physical distance $\Delta D$;
    2. producing a third signal having a time varying value which is a function of the velocity signal and resetting the time varying value of the third signal to a reference level in response to the first signal;
    3. producing a fourth signal having a time varying value which is a function of the instantaneous relationship between the constant value of the reference signal and the time varying value of the third signal; and
    4. producing the velocity signal as a function of the time varying value of the fourth signal sampled during the instantaneous occurrence of the second signal.

9. The method of claim 8 wherein the first signal has a predetermined reset period and the second signal has a predetermined sample period, the time varying value of the third signal is reset to the reference level during the reset period of the first signal and the time varying value of the fourth signal is sampled during the sampling period of the second signal to produce the velocity signal.

10. A method of deriving the velocity of strip material bearing spaced indicia and continuously moving in a path of travel, said method comprising the steps of:
  a. detecting the indicia on the strip material moving in said path of travel with respect to a first predetermined point and producing a first signal in response thereto;
  b. detecting the indicia on the strip material moving in said path of travel with respect to a second predetermined point physically displaced apart a distance $\Delta D$ in the direction of continuous movement of the strip material from the first predetermined point and producing a second signal in response thereto; and
  c. transforming the first and second signals into a velocity signal having a value dependent upon the velocity of the detected indicia, said transforming step further comprising the steps of:
    1. providing a reference signal having a constant value representative of an electrical analog of the physical distance $\Delta D$;
    2. integrating the value of the velocity signal over the period between successive occurrences of the first signal produced in response to the detection of successive indicia to produce a third signal having a time varying value and resetting the time varying value of the third signal to a reference level at each occurrence of the first signal;
    3. comparing the constant value of the reference signal with the time varying value of the third signal to produce a fourth signal having a time varying value which is a function of the instantaneous relationship between the values of the reference signal and the third signal; and
    4. integrating the instantaneous value of the time varying value of the fourth signal at each occurrence of the second signal to produce the velocity signal having a value representative of the velocity of the strip material and independent of the spacing of successive indicia on the strip material.

11. The method of claim 10 wherein the strip material comprises motion picture film and said spaced indicia comprise image frames on the motion picture film.

12. The method of claim 10 wherein the first signal has a predetermined reset period and the second signal has a predetermined sample period, the time varying value of the third signal is reset to the reference level during the reset period of the first signal and the time varying value of the fourth signal is sampled during the sampling period of the second signal to produce the velocity signal.

* * * * *